June 27, 1961 J. DURST 2,989,892
PHOTOGRAPHIC ENLARGER
Filed May 3, 1960 2 Sheets-Sheet 2

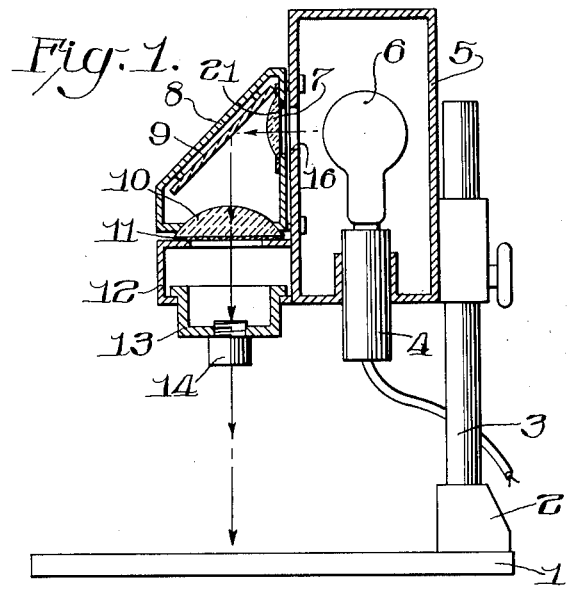
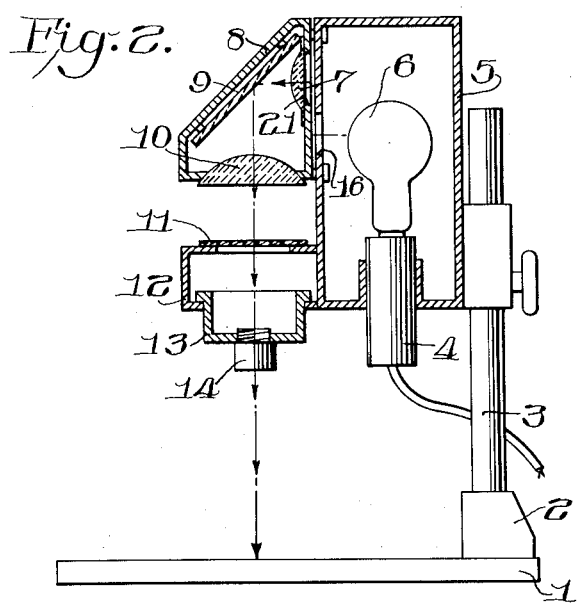

INVENTOR
Julius Durst
BY
Connolly and Hutz
ATTORNEYS

United States Patent Office 2,989,892
Patented June 27, 1961

2,989,892
PHOTOGRAPHIC ENLARGER
Julius Durst, Bressanone, Italy, assignor to Durst S.p.A. Fabrica Macchine Ed Apparecchi Fototecnici, Bolzano, Italy
Filed May 3, 1960, Ser. No. 26,585
Claims priority, application Italy July 28, 1959
7 Claims. (Cl. 88—24)

This invention relates to a photographic enlarger of the type in which a light is deflected from a lamp housing into the optical axis of a negative carrier, and it more particularly relates to an enlarger of this type including a condenser lens.

A conventional type of photographic enlarger in widespread use includes an objective lens having a vertical optical axis which can be laterally spaced from a source of light arranged in a vertical illuminating position because the light beams from this source are deflected into the axis. In this arrangement the condenser lens associated with the lamp is maintained in a fixed position relative to the lamp and a beam-deflecting mirror. The condenser lens associated with the negative is movably mounted to permit it to be either lifted or folded upward. When it is removed, the source of light must be turned off to avoid the omission of harmful stray rays of light. It is generally necessary to augment the slight weight of this condenser lens by springs to insure that it will flatten the negative. On the other hand it is also desirable to have free space above the negative plane available when the enlarger is used in copying work.

An object of this invention is, therefore, to provide a simple and economical structure for a photographic enlarger which facilitates its use in printing negatives and in copying.

In accordance with this invention, the condenser lenses and reflecting mirror of a photographic enlarger of the type described are mounted upon a single casing which is mounted to slide up and down upon the side of the lamp housing. The negative carrier is secured to a lower portion of the housing, and the condenser lens associated with the negative is mounted with its lower planar surface extending from the bottom of its casing to permit it to press against a negative placed upon the carrier to flatten it. The condenser lens associated with the lamp is mounted within the casing over an aperture which registers with an aperture in the wall in the side of the lamp housing to allow light to be emitted from the housing only when the holes are aligned. The casing also includes the reflecting mirror disposed between the condenser lenses for deflecting the horizontal rays from the lamp through the optical axes of the negative carrier. The casing may also be made completely detachable from the housing to free the space over the carrier and facilitate its use for copying work.

Novel features and advantages of the present invention will become apparent to one skilled in the art from a reading of the following description in conjunction with the accompanying drawings wherein similar reference characters refer to similar parts and in which:

FIGS. 1 and 2 are a side view in elevation of one embodiment of this invention in two separate phases of operation.

Figure 3:
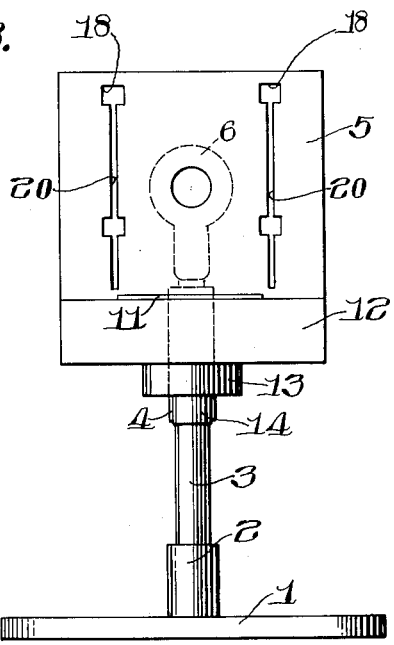
FIG. 3 is a front view of the stationary portion of the embodiment shown in FIGS. 1 and 2.

In FIGS. 1 and 2 is shown a photographic enlarger including an image reception or easel plate 1 with a vertical column of tubular form 3 mounted upon a pedestal 2 secured to plate 1. Lamp housing 5 is adjustably mounted upon column 3 by means of the illustrated screw-type clamp. However, for the purposes of this application housing 5 is described as stationary with respect to sliding casing 8 which moves relative to it.

A negative carrier 12 is secured to lamp housing 5, and a focusing or objective lens 14 is adjustably mounted in the bottom portion of negative carrier 12 by means of a telescopic tube 13. Within lamp housing 5, a source of light 6 which is a lamp is secured within a socket 4. It projects a horizontal beam of light which as shown in FIG. 1 extends through condenser or converging lens 7 mounted within sliding casing 8, and this beam is reflected or deflected into the optical axes of condenser lens 10 and objective lens 14 by mirror 9 which is diagonally mounted within the lower portion of movable casing 8, said condenser lens with its lower flat or planar surface being disposed adjacent the upper surface of negative carrier 12 for pressing a negative 11 flat against this upper surface. When casing 8 is lifted to the position shown in FIG. 2 its lower rear wall blocks off aperture 16 in the front wall of lamp housing 5 to prevent any stray light from being emitted from housing 5 when the unit is not projecting. In the position shown in FIG. 1 aperture 21 in casing 8 is aligned with aperture 16 in housing 5 to permit light to pass from housing 5 into casing 8.

Figure 4:
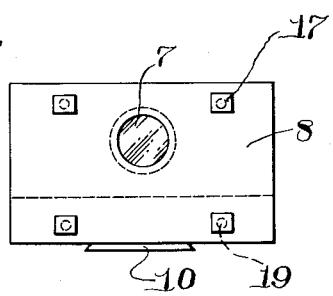
FIG. 4 is a rear view of the movable portion of the embodiment shown in FIGS. 1 and 2.

FIGS. 3 and 4 show lugs 17 extending from the rear wall of casing 8 which are inserted through openings 18 in the front wall of housing 5 to permit unit 8 to be attached and detached from the housing. When it is attached as shown in FIGS. 1 and 2, the smaller diameter rods 19 between lugs 17 and the wall of casing 8 ride up and down within slots 20 in the front wall of housing 5 to guide its upward and downward movement. This arrangement, therefore, facilitates the flattening and projection of negatives for enlargement purposes and the light sealing of the housing when negatives are being changed or removed. Furthermore, this detachable sliding arrangement of the casing in which the lenses and reflecting mirror are mounted facilitates complete removal of the casing when the negative carrier is being used for copying work.

What is claimed is:

1. A photographic enlarger comprising an easel plate, a lamp housing supported on said plate, a source of light disposed within said housing, a negative carrier mounted upon a side of said housing, an objective lens mounted upon said negative carrier with its optical axis intersecting said easel plate, the surface of said negative carrier remote from said objective lens being flat for receiving a negative, a casing mounted to slide towards and away from said negative carrier along the side of said housing, a condenser lens and mirror mounted within said casing, and said condenser lens having a planar lower surface which is positioned adjacent said flat surface of said negative carrier for flattening a negative against said flat surface.

2. A photographic enlarger as set forth in claim 1 wherein apertures are formed in adjacent walls of said casing and said housing which are aligned with each other to permit light beams to pass from said housing into said casing and be deflected along the optical axis of said negative carrier, and the wall of said casing adjacent said housing seals the aperture in said housing and prevents light from passing through it when said casing is slid away from said negative carrier.

3. A photographic enlarger as set forth in claim 1 wherein said casing is formed and arranged to permit it to be completely removed from said housing when it is slid away from said negative carrier.

4. A photographic enlarger as set forth in claim 1, wherein a pair of condenser lenses are mounted within said casing, apertures in said casing adjacent said negative carrier and said housing, said condenser lenses being mounted in line with said apertures, and said mirror being mounted between said condenser lenses to deflect light passing from said housing along the optical axis of said negative carrier.

5. A photographic enlarger as set forth in claim 4, wherein the portion of said condenser lens mounted adjacent said negative carrier extends a short distance beyond the adjacent surface of said negative carrier.

6. A photographic enlarger as set forth in claim 1 wherein said negative carrier has a substantially vertical optical axis, and said casing is slideable upwardly and downwardly to permit its weight to flatten a negative against the flat surface of said negative carrier.

7. A photographic enlarger as set forth in claim 6 wherein a detachable vertical slide means couples said casing to a side wall of said housing.

No references cited.